United States Patent [19]

Ellwood

[11] 4,184,773
[45] Jan. 22, 1980

[54] MIXER ROTOR WITH A SHEAR EDGE

[75] Inventor: Henry Ellwood, Rochdale, England

[73] Assignee: USM Corporation, Farmington, Conn.

[21] Appl. No.: 928,574

[22] Filed: Jul. 27, 1978

[30] Foreign Application Priority Data

Aug. 11, 1977 [GB] United Kingdom ............... 33676/77

[51] Int. Cl.² .......................... B01F 7/02; B29B 1/06
[52] U.S. Cl. .................................. 366/91; 366/300
[58] Field of Search ............. 366/83, 85, 79, 81, 366/84, 85, 297, 298, 299, 300, 301, 318, 319, 321, 324, 91; 425/207, 208; 264/349

[56] References Cited

U.S. PATENT DOCUMENTS

| | | | |
|---|---|---|---|
| 2,745,643 | 5/1956 | Kleinlein | 366/85 |
| 3,154,808 | 11/1964 | Ahlefeld | 366/76 |
| 3,254,367 | 6/1966 | Erdmenger | 366/85 |
| 3,610,585 | 10/1971 | MacLeod | 366/300 |
| 3,704,866 | 12/1972 | Mosher | 366/80 |
| 3,888,469 | 6/1975 | Geyer | 366/79 |
| 3,941,357 | 3/1976 | Wurtz | 366/300 |

*Primary Examiner*—Robert W. Jenkins
*Attorney, Agent, or Firm*—Donald N. Halgren; Richard B. Megley; Vincent A. White

[57] ABSTRACT

A high intensity internal mixer for plasticizing material, having a mixing chamber comprising a plurality of interconnected mixing bores. Each bore contains a rotor for mixing material therewithin. Each rotor has at least one blade or wing with a sharp edge on its outer extremity adjacent the leading edge of the wing. The sharp edge is formed by a groove being cut along the extremity of the leading edge of the wing of the rotor blade. Each blade has a slight helical twist, and is configured to provide efficient material breakup.

6 Claims, 2 Drawing Figures

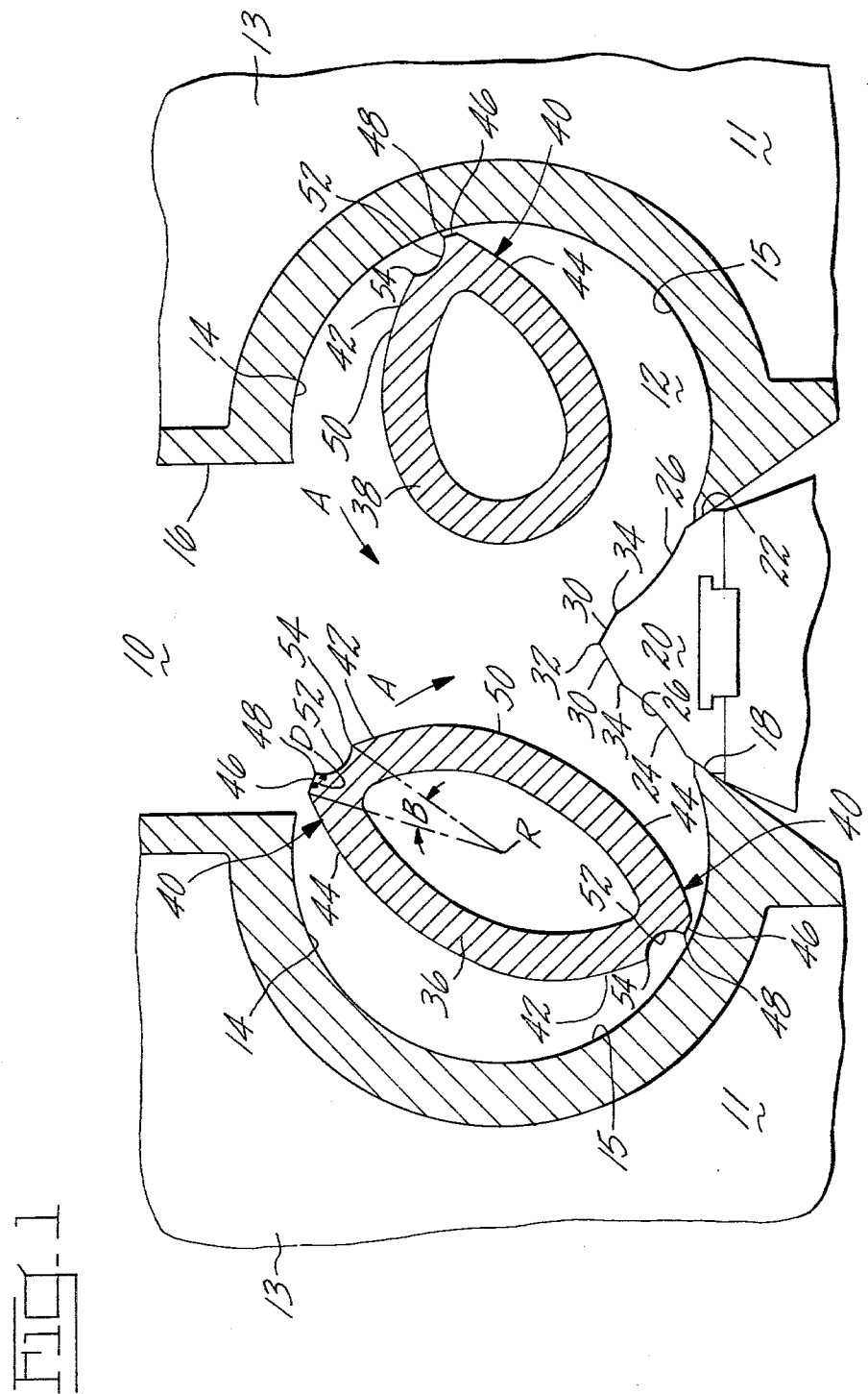

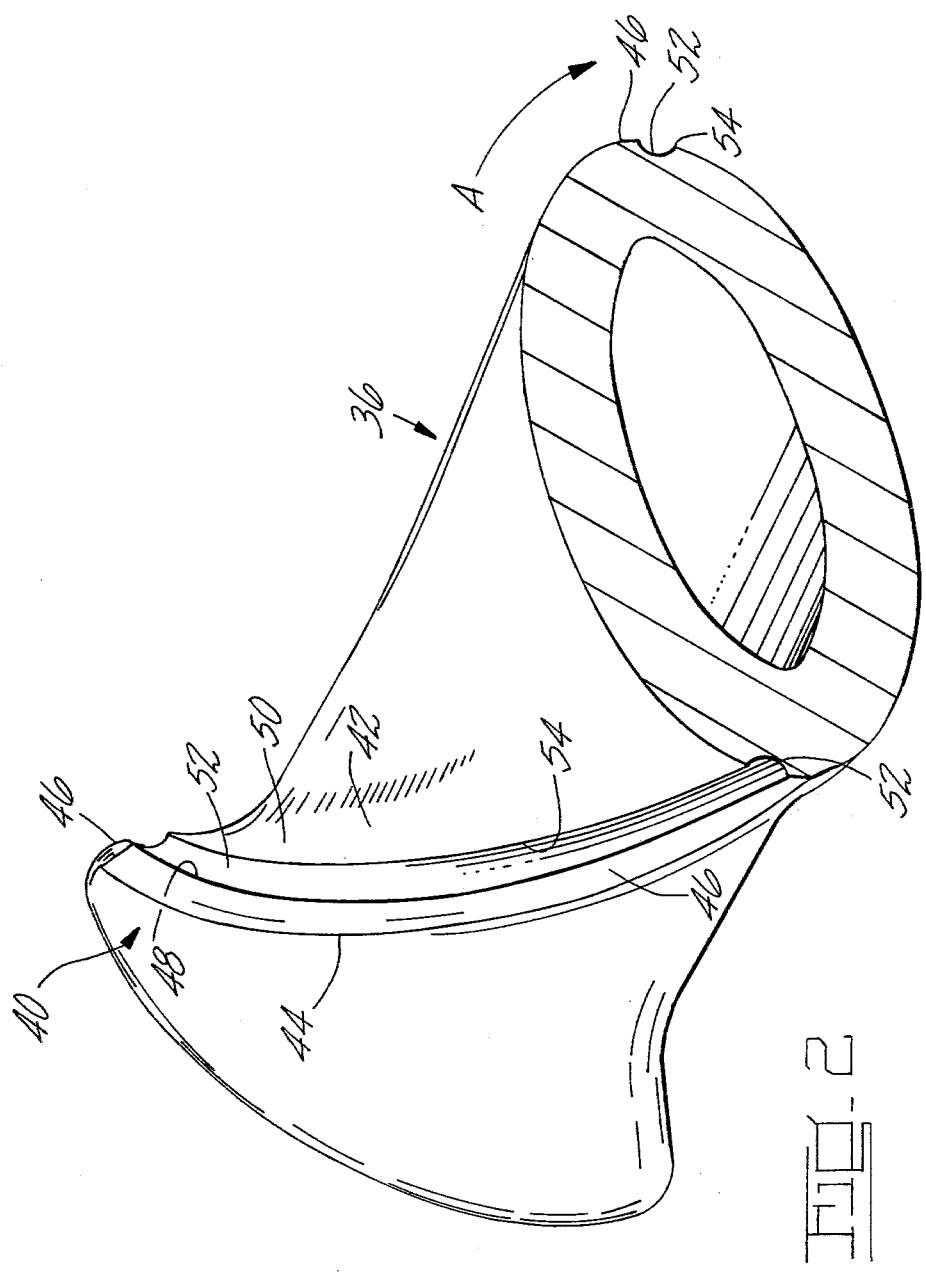

MIXER ROTOR WITH A SHEAR EDGE

BACKGROUND OF THE INVENTION

1. Field of the Invention

This invention is concerned with improvements in or relating to internal mixing machines and more particularly to rotors for use therein.

2. Prior Art

One type of mixer which is commonly used for compounding rubber or plastic materials is known as an internal mixer. U.S. Pat. Nos. 3,704,866 to Mosher et al, and 3,154,808 to Ahlefeld, Jr. et al, both assigned to the assignee of the present invention, and herein incorporated by reference, show internal mixing apparatus of the type discussed for use with the present invention. This type of internal mixer is manufactured by the present assignee under the trademark "BANBURY". The internal mixers comprise a composite mixing chamber formed by two parallel transversely interconnected cylindrically shaped chamber portions each of circular cross section arranged so that, in cross section, the mixing chamber has approximately the shape of a FIG. 8. A mixing rotor is mounted for rotation, one in each chamber portion of circular cross section. A centrally disposed inlet opening for internal mixers is generally provided through an upper wall of the mixing chamber between the two rotors. A centrally disposed outlet opening from the mixing chamber is disposed below the rotors through the wall of the mixing chamber. When the outlet opening is closed by a suitable closure member, material to be mixed is introduced to the mixing chamber through the inlet opening and forced into the mixing chamber and into engagement with the rotating rotors under pressure applied through a ram. When all the material introduced into the mixing chamber has been adequately mixed, the closure member closing the outlet opening is removed to allow the mixed material to discharge through the outlet opening. Such internal mixers perform satisfactorily on a wide range of materials; however, it has been found that when the material to be mixed includes large chunks of stiff and rigid material, the chunks have sometimes become lodged in a position in the mixing chamber in which the rotors are jammed and are prevented from rotating. This jamming in the prior art internal mixers will usually cause considerable damage to the mixer. For example when using internal mixers to plasticize and recompound scrap polyvinyl chloride, chunks causing jamming of the rotors has occured to the detriment of the mixer.

It is an object of the present invention to eliminate jamming of the rotor blades by chunks of material lodged therebetween.

BRIEF SUMMARY OF THE INVENTION

The present invention comprises an internal mixer wherein a mixing chamber is formed by two interconnected cylindrical portions each of circular cross section, arranged so that when they are interconnected in cross section, the mixing chamber has approximately the shape of a FIG. 8. A mixing rotor is mounted for rotation in each cylindrical portion of circular cross section, each rotor having at least one blade thereon. Each blade has a leading side and a trailing side. The leading side of the blade has a sharp edge facing in the direction of rotation formed at its outer extremity. The portions of circular cross section are cylindrical and preferably are of equal diameter.

The mixer comprises a discharge opening from the bottom of the mixing chamber extending lengthwise of the mixing chamber, wherein a center-line of the opening is equidistant from the axes of rotation of the rotors. The discharge opening is centrally disposed relative to the rotors. The discharge opening is closed by a discharge door, an upper surface of which commonly projects into the mixing chamber during operation of the mixer. The upper surface of the discharge door comprises two outer curved portions (one at each side of a center-line of the door). Each curved portion of the discharge door is continuous with an adjacent cylindrical part of a body portion of the mixer to define part of the portions of circular cross section. The two inner portions of the door meet at a central linear edge equidistant from the axis of rotation of the rotors and also meet the outer curved portions of the upper surface of the door at edges equidistant from the center edge.

Each blade in the mixer of the present invention comprises a connecting surface which, in cross section, is preferably flat or may for example be curved convexly e.g. having a radius of curvature centered on the axis of rotation of the rotor, connecting the leading side at the trailing side of each blade. The leading side of each blade, in cross section, may consist of a convex surface separated from the sharp edge at the outer extremity of the leading side by a recess or groove. The sharp edge is thus formed where the surface of the recess meets the connecting surface of the blade. The recess, in cross section, generally forms part of a circle.

Each blade has a degree of helical twist, proceeding axially along the rotor, the degree of helical twist being so slight that the blade extends round less than 90° of arc from the beginning to the end of the blade.

The rotors are arranged to counter rotate with the outer extremities of each of the rotors travelling generally downwardly in the vicinity of a central region of the mixing chamber above the discharge door.

BRIEF DESCRIPTION OF THE DRAWINGS

The various object and advantages of the present invention will become more apparent from the following drawings, in which:

FIG. 1 is a cross-sectional view of a mixer having rotors constructed according to the principles of the present invention; and FIG. 2 is a perspective view of one of the rotors of the present invention.

DESCRIPTION OF THE PREFERRED EMBODIMENT

Referring to the drawings in detail, and particularly to FIG. 1, there is shown an interal mixer 10 for plasticizing material supplied thereto, which mixer has a main body portion 11 having an internal surface which defines a mixing chamber 12. The main body portion 11 is comprised of at least a pair of transversely adjacent body portions 13, each having a generally cylindrically shaped bore 14 therein which define the mixing chamber 12. The adjacent cylindrical bores 14 have longitudinal axes that are parallel to one another, so that in cross-section, the mixing chamber 12 which may be formed by the adjacent bores 14, has an arrangement of wall surfaces 15, comprising generally the shape of a FIG. 8. An inlet opening 16 is formed through the body portion 11 above the mixing chamber 12, to permit loading of mix material into a central portion of the mixing chamber 12.

A discharge opening 18 is disposed in the lower side of the main body portion 11 and opens from the central region of the mixing chamber 12. The discharge opening 18 may extend along the entire length of the bottom of mixing chamber 12. The walls of the discharge opening 18 formed in the main body portion 11 are inclined inwardly and upwardly therein.

The internal mixer 10 includes a discharge door 20 which is supportably arranged with the discharge opening 18. The discharge door 20 is closed in the operation of the internal mixer 10. The discharge door 20 has an arrangement of inclined side surfaces 22 which mate with and engage the inclined walls of the discharge opening 18 to seal the discharge opening 18. The discharge door 20 has an upper surface 24 which projects into the mixing chamber 12. The upper surface 24 comprises a pair of outer curved portions 26 (one at each side of a central linear edge 32 or ridge line, only and end view being shown here, of the discharge door 20 which may extend the full length of the mixing chamber 12 and is preferably disposed parallel with the longitudinal axes of the cylindrical bores 14). When the discharge door 20 is in a closed position with respect to the side surfaces 22 of the discharge opening 18, the upper curved surface 24 is substantially continuous with the adjacent wall surfaces 15 of the mixing chamber 12 of the internal mixer 10, to define part of the cylindrical bores 14. The upper surface 24 of the discharge door 20 also comprises two flat inner portions 30 which meet at the central linear edge 32. The two inner portions 30 each meet their respective adjacent outer curved portions 26 at a second linear edge 34.

The internal mixer 10 also comprises a pair of rotors 36 and 38, each rotor having at least one blade 40 along its extremity. The rotors 36 and 38, are mounted for rotation in the internal mixer 10 in the directions indicated by the arrows A on the drawings. The rotors 36 and 38, thus rotate in opposite directions with the blades 40 of the rotors 36 and 38 travelling generally downwardly in the vicinity of the central region of the mixing chamber 12 above the discharge door 20. The blades 40 of each of the rotors 36 and 38 start at opposite ends of the rotor and continue partly along the rotors so that they overlap axially over part of their length, the blades 40 being diametrically opposite at those regions of the rotor where they overlap axially. Each rotor 36 and 38, is mounted for rotation in one of the cylindrical bores 14 of the mixing chamber 12 with the axis of rotation of the rotor coinciding with the central axis of the associated cylindrical bore 14.

Each of the blades 40 comprise a leading side 42 and a trailing side 44. The leading side 42 and trailing side 44 of each blade 40 are connected by a connecting surface 46 which, in cross section at right angles to the axis of rotation of the associated rotor, is generally flat. The leading side 42 of each blade 40 has a sharp edge 48 disposed in the direction of the rotation of the rotor and is formed at the radially outer extremity of the leading side 42 where it meets the connecting surface 46. The leading side 42 of the blade 40 of one of the rotors 36, for example, of the internal mixer 10 consists, in cross section at right angles to the axis of rotation R of the rotor 36, of a convex surface 50 separated from the sharp edge 48 at the outer extremity of the leading side 42 by an elongated recess 52 or groove. The sharp edge 48 is thus formed where the surface of the leading side 42 defining the recess 52 meets the flat connecting surface 46 of the blade 40. The recess 52, in cross section, generally forms part of a circle. The flat connecting surface 46 and the surface of the recess 52 at the sharp edge 48 form an angle D which may be slightly less than about 90°. The depth of the recess 52 is such that, in cross section at right angles to the axis of rotation of one of the rotors 36, for example, the angle between a line drawn from the center or axis of rotation R of the rotor 36 to the point at which the flat connecting surface 46 meets the trailing side 44 of the blade makes an angle B, of less than 10°, as shown in FIG. 1, with a line drawn from the axis of rotation R of the rotor 36, to an edge 54 at which the surface of the recess 52 meets the convex surface 50 of the leading side 42 of the blade 40. These recess 52 is thus in the form of a groove running along an outer edge portion of the leading side 42 of the blade 40.

Each of the blades 40 extends along a considerable part of the length of the rotors 36 and 38, and each of the blades 40 may have, in one embodiment, a small degree of helical twist, proceding axially along the rotor, as can be seen in FIG. 2. The degree of helical twist of each blade 40 may be so slight that the blade 40 extends around less than 90° of arc from the beginning to the end of the blade. The blade 40 would also be straight or substantially so.

Operation of the internal mixer 10 is shown in FIG. 1, with the discharge door 20 closed. Materials to be mixed and compounded may be introduced through the inlet opening 16 to the mixing chamber 12. During operation of the internal mixer 10, the rotors 36 and 38, are caused to rotate in opposite directions (as shown by the arrows A in FIG. 1) to mix the materials introduced in the mixing chamber 12. The materials may be retained in the mixing chamber 12 under a preselected pressure by a ram urged downwardly in the inlet opening by a pneumatic cylinder (not shown). The rotors 36 and 38, are arranged to rotate at slightly different speeds (the ratio of speeds being about 1:1.1).

As the rotors 36 and 38 rotate, the materials in the mixing chamber 12 are primarily worked between the leading side 42 of the blades 40 and the walls bounding the mixing chamber 12. Material is also tranferred from one cylindrical portion 14 of the mixing chamber to the other cylindrical portion 14 by action of the rotors 36 and 38, ensuring that the materials in the mixing chamber 12 are thoroughly mixed and compounded.

The outer extremities of the blades 40 in the operation of the internal mixer 10, sweep a cylinder of slightly smaller radius than the cylindrical bores 14 of the mixing chamber 12, the difference in radius being fractions of an inch. Chunks of hard material have, in previously known internal mixers, been jammed between the rotors and the discharge door during rotation of the blades. When a chunk of material which would have caused damage in the previously known mixers becomes lodged in a position straddling above the present discharge door 20, during rotation of the rotor, the piece is met by the sharp edge 48. A scissors action takes place between the edge 48 and connecting surface 46 of the blade 40 and the edge 34 and curbed portion 26 of the discharge door 20, causing the chunk of material to be broken up. The recess 52 may allow accommodation of some of the material of the chunk in this recess. When the materials have been thoroughly mixed, the discharge door 20 may be opened and material discharged for further processing in any known manner.

The internal mixer is especially suitable for use in re-working scrap material produced in the calendered polyvinyl chloride sheet industry, in which wads e.g. 3" to 4" thick of polyvinyl chloride material which need to be re-worked are supplied to an internal mixer. The shock loads applied to the rotor of the present internal mixer appear to be diminished when compared with the shock loads to which the rotors have previously known mixers have been subjected, thereby reducing the possibility that damage to the mixer will occur.

Thus there has been described an internal mixing machine having an arrangement of rotors which are adapted to mix and work material which may contain hard chunks therein, and conjunctively to minimize damage to the rotors and housing of the mixing machine due to the presence of those hard chunks of material.

Though the invention has been described with a degree of particularity, it is intended that the appended claims be interpreted as exemplary only, and not in a limiting sense.

I claim:

1. An internal mixing machine for plasticizing material supplied thereto, said mixing machine comprising:
   a main body portion having an internal wall arrangement which defines a mixing chamber;
   said internal walls of said mixing chamber being generally comprised of at least two transversely adjacent cylindrical bores arranged within said main body portion, wherein said mixing chamber, in cross-section has approximately the shape of a figure 8; and
   a mixing rotor mounted for rotation in each of said cylindrical bores,
   each of said rotors having at least one blade thereon, each blade comprising a leading side and a trailing side;
   said leading side having a sharp edge formed at its outer extremity and facing in the direction of rotation of said blade;
   each of said blades comprises a connecting surface, which in cross-section is generally flat, and which connects said leading side and said trailing side of each blade;
   said leading edge in cross-section includes a convex surface separated from said sharp edge at the outer extremity of the leading edge, by a recess, said sharp edge being formed in cross-section where the surface of said recess meets said connecting surface of the blade, said recess, in cross-section, forming a part of a circle.

2. An internal mixing machine as recited in claim 1 including:
   a discharge opening disposed in the bottom of said main body portion;
   said discharge opening extending lengthwise beneath the middle of said mixing chamber and midway between the axes of rotation of said rotors; and
   a discharge door arrangeable in said discharge opening in the bottom of said main body portion so as to permit containment as well as discharge of any material within said mixing chamber during the operational sequences of said mixer;
   said discharge door having an upper surface which projects into said mixing chamber;
   said upper surface of said discharge door comprising a pair of outer curved portions, one at each side of a central linear ridge line on said upper surface of said discharge door, each of said outer curved portions defining a wall section of said internal walls of their respective cylindrical bores comprising said mixing chamber, and a pair of inner portions of said upper surface which meet each other at said central linear ridge line and meet their respective outer curved portion of said upper surface of said discharge door at linear edges equidistant from said central linear ridge line.

3. An internal mixing machine as recited in claim 1, wherein the angle between said connecting surface and the surface of said recess may range from about 70° up to about 90°; and
   the angle between a line from the center of rotation of said rotor to where said connecting surface meets said trailing side of said blade and a line from the axis of rotation of said rotor to the edge at which the surface of said recess meets said convex surface of said leading side of said blade, is less than about 10°.

4. An internal mixing machine as recited in claim 1, wherein each of said blades has a degree of helical twist proceeding axially along said rotor, said degree of twist of said blades from the beginning to the end thereof, being less than about 90°.

5. An internal mixing machine as recited in claim 1, wherein said rotors counter rotate with respect to one another, the outer extremities of said rotors travelling generally downwardly in the central region of said mixing chamber above said discharge door.

6. An internal mixing machine as recited in claim 5, wherein said rotors rotate at slightly different speeds from one another.

* * * * *